(12) United States Patent
Demirekler et al.

(10) Patent No.: US 6,980,646 B1
(45) Date of Patent: Dec. 27, 2005

(54) APPARATUS AND METHOD FOR ECHO CANCELLATION

(75) Inventors: Levent Demirekler, Columbia, MD (US); Aleksandar Purkovic, Potomac, MD (US)

(73) Assignee: Nortel Networks Limited (CA)

(*) Notice: Subject to any disclaimer, the term of this patent is extended or adjusted under 35 U.S.C. 154(b) by 539 days.

(21) Appl. No.: 09/977,005

(22) Filed: Oct. 12, 2001

(51) Int. Cl.$^7$ .............................................. H04M 1/00

(52) U.S. Cl. .............................. 379/406.08; 379/406.11

(58) Field of Search ........................... 379/322, 406.01, 379/406.08, 406.09; 703/322

(56) References Cited

U.S. PATENT DOCUMENTS

| | | | | | |
|---|---|---|---|---|---|
| 5,343,522 | A | * | 8/1994 | Yatrou et al. | 379/406.09 |
| 6,240,180 | B1 | * | 5/2001 | Younce et al. | 379/406.09 |

* cited by examiner

Primary Examiner—Xu Mei
Assistant Examiner—Jefferey F. Harold
(74) Attorney, Agent, or Firm—Steubing McGuinness + Manaras LLP

(57) ABSTRACT

An apparatus and method for echo cancellation that detects and tracks the active regions of the echo channel impulse response rather than the entire echo channel impulse response and uses this sparse model to cancel the echo component of the received signal. Two sets of filter coefficients are used, one to remove and track the active regions and one to detect the active regions.

28 Claims, 14 Drawing Sheets

APPARATUS AND METHOD FOR ECHO CANCELLATION

FIELD OF THE INVENTION

The present invention relates generally to communication systems, and more particularly to echo cancellation in a communication system.

BACKGROUND OF THE INVENTION

In today's information age, communication systems carry voice, fax, data, video, and other information over a variety of communication media using a variety of communication technologies. In such communication systems, communication signals often become distorted from a variety of causes.

One type of distortion occurs when a transmitted signal is reflected back to a communication device as part of a received signal. Depending on the type of communication channel involved, the received signal can include a single echo or multiple echoes of the transmitted signal. This echo component of the received signal can cause errors and other problems unless the communication device removes, reduces, or otherwise compensates for the echo component.

Therefore, the communication device typically includes an adaptive filter for canceling the echo component of the received signal. For convenience, this adaptive filter is often referred to as an echo canceller.

The echo canceller design depends upon a number of factors, including the echo channel impulse response length of the communication channel. In communication systems having large delays, the echo channel impulse response can be quite long. In such communication systems, an echo canceller that covers the entire echo channel impulse response can be highly complex and require substantial processing resources. Such an echo canceller is typically also slow to converge.

SUMMARY OF THE INVENTION

In accordance with one aspect of the invention, an echo canceller detects and tracks the active regions of the echo channel impulse response (rather than the entire echo channel impulse response) and uses this sparse model to cancel the echo component of the received signal. The sparse model uses two sets of filter coefficients, one to remove and track the active regions in the echo path and one to detect the active regions in the echo path.

In accordance with another aspect of the invention, canceling an echo component of a received signal involves detecting active regions of an echo channel impulse response and filtering the signal contributed by the active regions of the echo channel impulse response using a first set of filter coefficients. Detecting active regions of the echo channel impulse response involves computing an estimate of the echo channel impulse response using a number of short finite impulse response filters represented by a second set of filter coefficients, computing an average error (average power of the error signal) for each short finite impulse response filter, identifying up to L short finite impulse response filters having a lowest average errors, where L is a predetermined maximum number of reflections tracked by the echo canceller. Filtering the signal contributed by the active regions of the echo channel impulse response involves transferring to the first set of filter coefficients those filter taps from the second set of filter coefficients corresponding to the L short finite impulse response filters having the lowest average errors. In a typical embodiment, two short finite impulse response filters having the lowest average errors are initially transferred from the second set of filter coefficients to the first set of filter coefficients when certain conditions are met. Later, short finite impulse response filters having the lowest average errors are transferred one at a time from the second set of filter coefficients to the first set of filter coefficients when other conditions are met. Canceling an echo component of a received signal also involves distributing a number of additional filter taps equally among the two reflections having the highest tap power modeled by the first set of filter coefficients. Canceling an echo component of a received signal also involves computing a first average error using all reflections modeled by the first set of filter coefficients, computing a second average error using all reflections modeled by the first set of filter coefficients except the lowest power reflection, removing the lowest power reflection from the first set of filter coefficients if the second average error is smaller than the first average error, and typically also distributing the filter taps associated with the removed lowest power reflection among the remaining reflections modeled by the first set of filter coefficients. Tracking the active regions in the echo path involves comparing the filter tap powers of each reflection in the first set of filter coefficients and updating their locations based upon the filter tap powers of each reflection in the first set of filter coefficients.

DETAILED DESCRIPTION OF A PREFERRED EMBODIMENT

In an embodiment of the present invention, an echo canceller detects and tracks the active regions of the echo channel impulse response (i.e., regions with the most dominant contribution to the echo signal) rather than the entire echo channel impulse response. The echo canceller uses this sparse model to cancel the echo component of the received signal. Among other things, this sparse model increases the speed of convergence, decreases computational complexity, and allows for pooling (intelligent resource allocation). This sparse model works well whether the echo channel impulse response includes a single reflection or multiple reflections. For convenience, such an echo canceller is referred to hereinafter as a sparse echo canceller.

A typical echo channel impulse response has one or more echoes separated by arbitrary delays. Thus, a typical echo channel impulse response can be described as a bulk delay followed by multiple dispersive regions. In general, the dispersive regions make up only a small portion of the total impulse response length of the communication channel. The sparse echo canceller uses multiple short finite impulse response (FIR) filters to cover echo channel impulse responses of a predetermined length. The sparse echo canceller updates each short FIR filter independently using a normalized least squares (NLMS) technique. The sparse echo canceller detects active regions of the echo channel impulse response by comparing the errors made by each short FIR filter, and tracks the active regions by comparing filter tap powers corresponding to each reflection in the echo path.

Figure 1A:
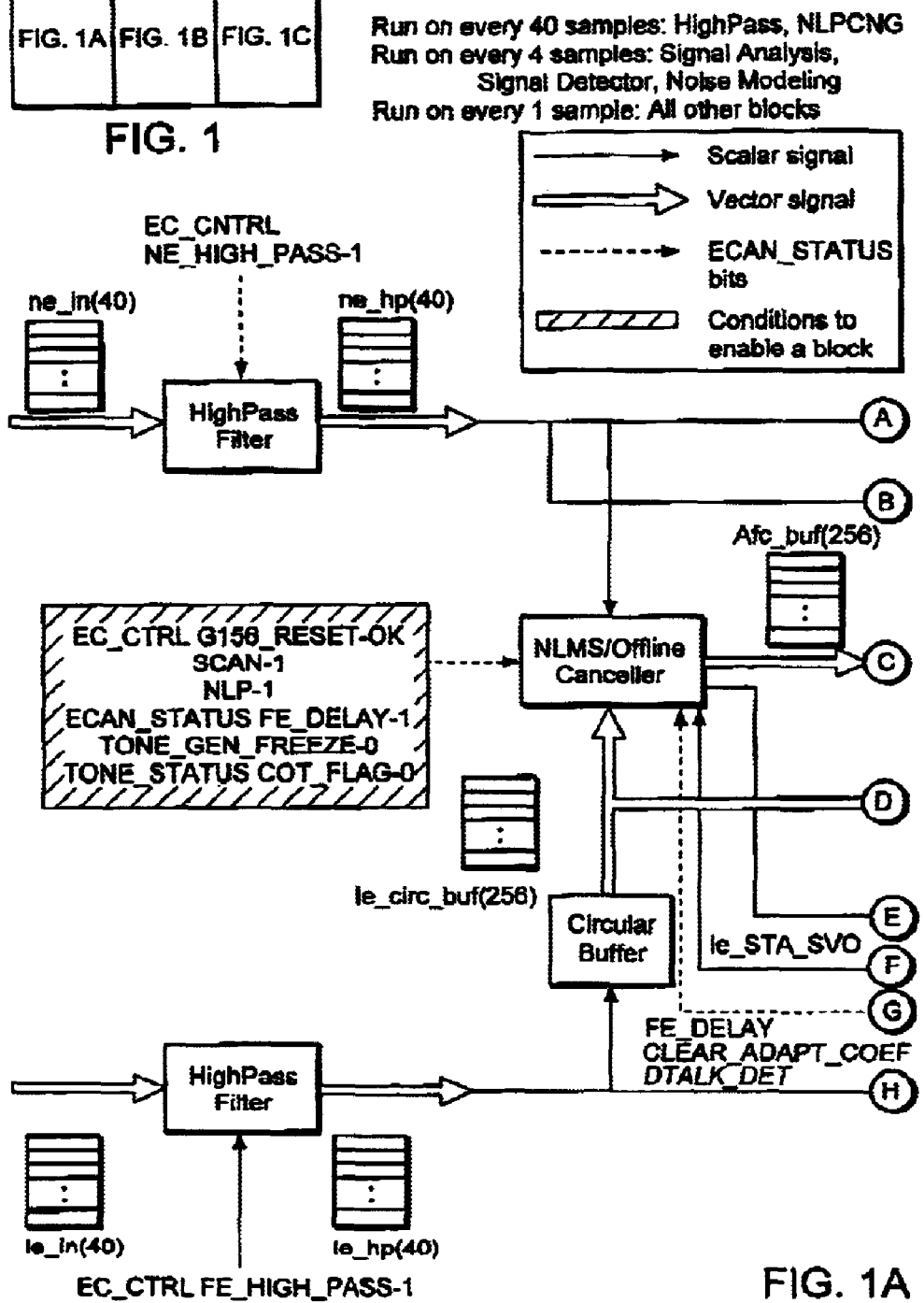
FIG. 1 is a schematic block diagram showing the relevant logic blocks of an exemplary echo canceller as known in the art.
Figure 1B:
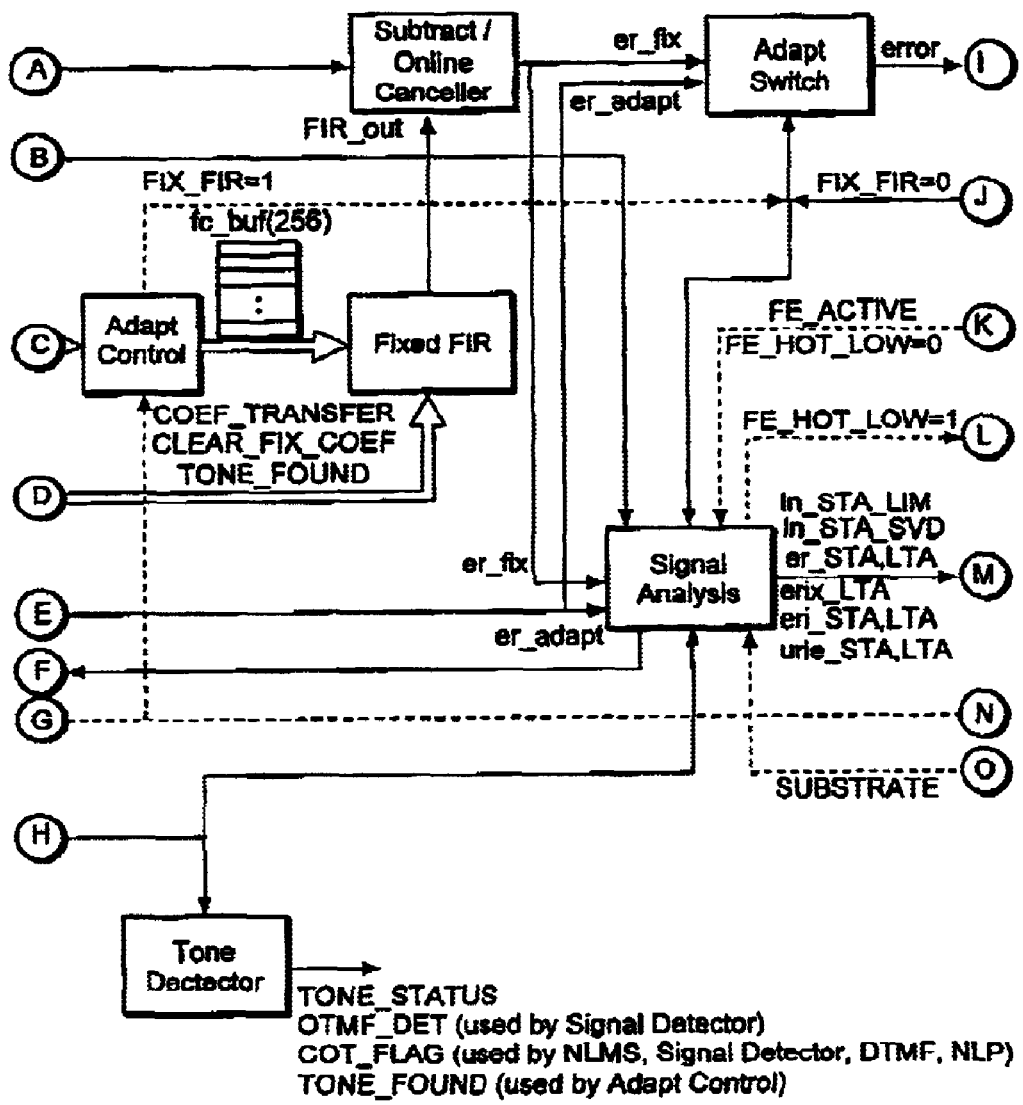
Figure 1C:
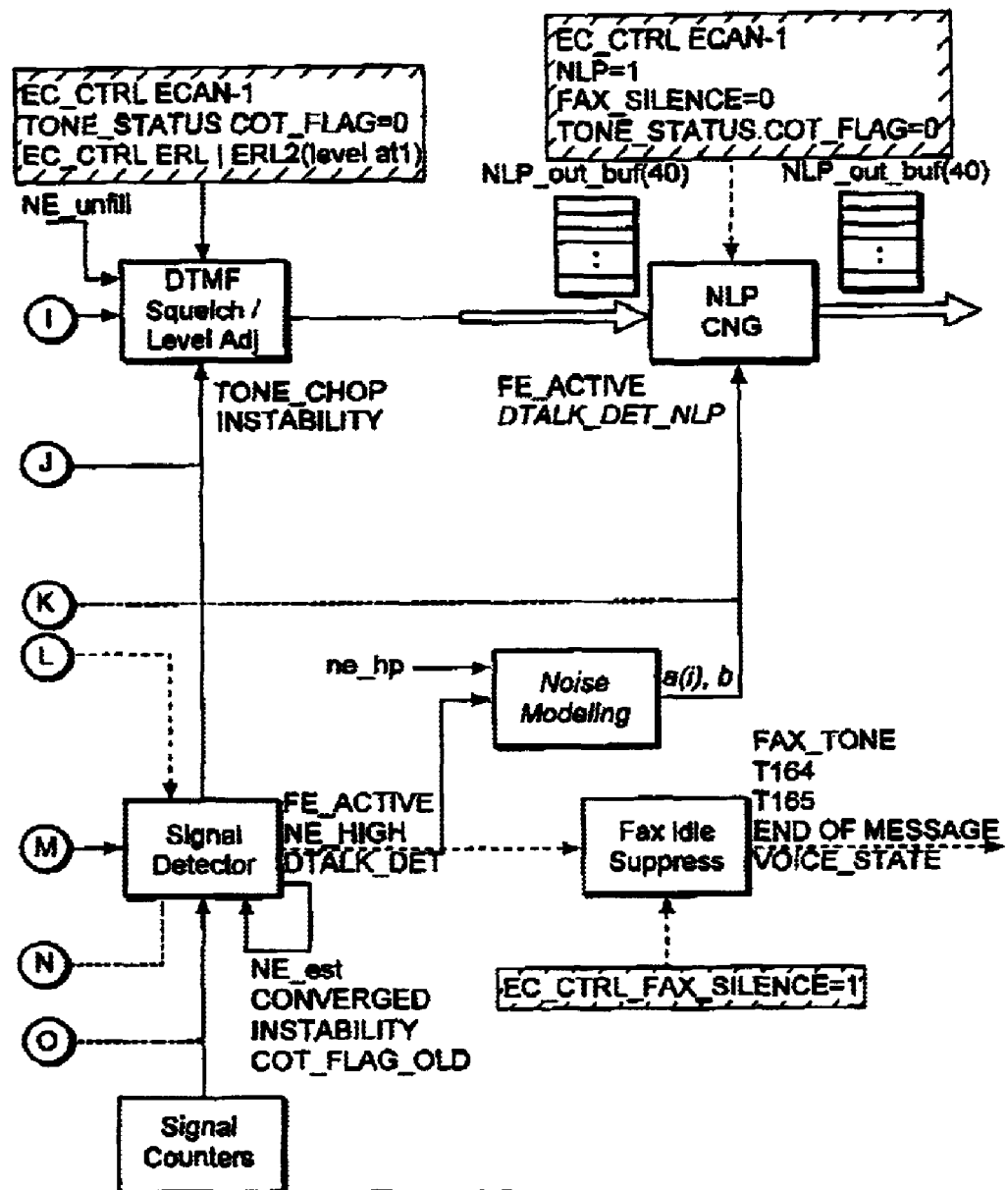

FIG. 1 is a block diagram showing the relevant logic blocks of an exemplary echo canceller 100 as known in the art. Among other things, the echo canceller 100 includes High-Pass Filter logic, Circular Buffer logic, NLMS/Off-Line Canceller logic, Fixed FIR logic, Adaptive Control logic, Adaptive Switch logic, Subtractor/On-Line Canceller logic, Signal Analysis logic, Signal Detection logic, DTMF Squelch logic, Noise Modeling logic, and Non-Linear Processor (NLP)/Comfort Noise Generation (CNG) logic. The High-Pass Filter logic and the NLP/CNG logic typically run every 40 samples (5 ms subrate). The Signal Analysis logic, Signal Detection logic, and Noise Modeling logic typically run every 4 samples (0.5 ms subrate). The remaining logic blocks typically run every sample (0.125 ms).

The High-Pass Filter logic removes the DC component from the input signals, both far-end and near-end. A portion of the input signal is received in a 40-sample input array, and the High-Pass Filter logic stores the DC-removed output samples in a 40-sample output array. The High-Pass Filter logic uses following recursive filtering:

$$y(n)=x(n)-w(n-1)$$

$$w(n)=\alpha y(n)+w(n-1)$$

where x(n)=Input signal
y(n)=Output-dc removed signal
w(n)=Estimated signal dc level
$\alpha=\frac{1}{8}$ The transfer function is:

$$H(z) = \frac{Y(z)}{X(z)} = \frac{1-z^{-1}}{1-(1-\alpha)z^{-1}}$$

The above filtering is performed on every sample in the 40-sample finput array, and output samples are stored in the 40-sample output array.

The Circular Buffer logic receives the DC-free far-end signal from the High-Pass Filter logic and outputs an updated far-end signal circular buffer to be used by the NLMS logic and the Fixed FIR logic. This function is to store the DC-free far-end signal into circular buffer and update the circular index. It runs at full rate. Each time it runs, it takes a sample from the 40-sample output array, stores it into a location indexed by a current circular index in a far-end circular buffer, and updates the index. The total circular buffer size is 256 in order to handle up to a 32 ms tail length. The actual operating size is equal to a configured number of taps (e.g., 128 taps for a 16 ms tail length).

The NLMS/Off-Line Canceller logic uses a standard normalized LMS (NLMS) algorithm to estimate the hybrid impulse response of the input signal. The NLMS/Off-Line Canceller logic receives the far-end signal stored in the circular buffer, the Adaptive FIR filter coefficients, and a near-end sample (echo and/or near-end speech), and outputs an error signal/residual echo from adaptive FIR (er_adapt) as well as updated adaptive FIR filter coefficients.

The adaptive algorithm for FIR filtering and echo estimation is as follows:

$$y(n) = \sum_{k=0}^{N-1} x(n-k)h_k$$

The adaptive algorithm for error calculation is as follows:

$$e(n)=s(n)-y(n)$$

The adaptive algorithm for coefficient update is as follows:

$$h_k(n)=h_k(n-1)+\beta e(n)x(n-k)/(|x|^2+\delta)\ k=0, 1, 2, \ldots N-1$$

where x(n)=Far-end signal
y(n)=Echo estimate
s(n)=Echo and/or near-end speaker signal
h(n)=Time-variant adaptive filter coefficients
e(n)=Error signal/Residual echo
β=Variable adaptation step size
δ=Small number to avoid overflow
|x|=Absolute average level of far-end signal.

The envelope of far-end short-term average is used as |x|, as described with reference to the Signal Analysis logic below.

In this embodiment, echo estimate and error calculation run all the time as long as echo cancellation is enabled. Coefficient update is typically only run after the far-end has been active for a certain amount of time, and may be suspended during certain echo canceller operations (e.g., double talk).

The Fixed FIR logic performs FIR filtering on far-end signals to generate the estimated echo that is used by the Subtractor logic to cancel the echo. The Fixed FIR logic receives the far-end signal stored in the circular buffer and the fixed FIR filter coefficients and outputs the estimated echo to be used by the Subtractor logic. The Fixed FIR filter coefficients are transferred from NLMS logic adaptive filter by the Adaptive Control logic under the control of a signal from the Signal Detector logic.

The Subtractor/On-Line Canceller logic cancels the echo by subtracting the fixed-FIR output from the near-end signal (assuming echo cancellation is enabled). The Subtractor/On-Line Canceller logic receives the near-end sample (echo and/or near-end speech) and the estimated echo from the Fixed FIR logic and outputs an error signal/residual echo from the fixed FIR.

The Adaptive Control logic transfers coefficient from the off-line adaptive FIR to the on-line fixed FIR filters based upon a signal from the Signal Detection logic. The transfer takes place when the adaptive filter long term averaged error is better than the fixed FIR filter to some degree for a certain period of time while echo cancellation is stable. This logic also clears the fixed FIR filter coefficients at certain times (e.g., at the end of a tone), in which case no transfer is done.

The Adaptive Switch logic switches between off-line and on-line echo cancellers based upon an input signal. The Adaptive Switch logic receives the error signal from the fixed FIR (i.e., the output of the Subtractor logic) and the error signal from the adaptive FIR (i.e., the output of the NLMS logic), and outputs the overall error signal to the NLP logic. Typically, at the beginning of echo canceller convergence, the output is taken from the adaptive FIR. After a certain degree of convergence, the first coefficient transfer takes place, the adaptive FIR goes off-line, and the fixed FIR is used as on-line canceller. The fixed FIR is typically kept on-line thereafter unless the echo canceller becomes unstable, in which case the above procedure is repeated.

The Signal Analysis logic provides characteristics of input and output signals of echo canceller that are used to control the operation of various logic blocks. The Signal Analysis logic receives the far-end and near-end signals with DC removed and the error signals from the fixed FIR and the adaptive FIR, and outputs a far-end signal short-term average, a near-end signal short-term average, an error signal from the adaptive FIR short-term and long-term average, an error signal from the fixed FIR short-term and long-term average, an echo return loss (ERL) short-term and long-term estimate, and an echo return loss enhancement (ERLE) short-term and long-term estimate.

The Signal Detection logic monitors the status of echo canceller inputs and outputs using signal estimates from the Signal Analysis logic. The functions performed by this logic include far-end signal activity detection, double talk activity detection, and various tests (e.g., instability test, convergence test, coefficient transfer test).

The DTMF Squelch logic suppresses echo of DTMF digit bouncing from a hybrid with unconverged ECAN so as to avoid the detection of double/multiple digits by the far-end DTMF decoder.

The Noise Modeling logic estimates the spectrum and energy of the near-end environmental background noise. It collects near-end background noise samples, calculates auto-correlations $r[0]$~$r[N]$, and runs Levinson Durbin recursion to solve the Yule-Walker equations for autoregressive model parameters (or prediction coefficients) $a[1]$~$a[N]$ and mean square prediction error $e_N$, where $a[i]$ and $e_N^{1/2}$(as level_scale) will be used in the CNG logic for level and spectrum matching. The notation for $e_N^{1/2}$ is b in FIG. 1.

The NLP/CNG logic is used to suppress the residual echo. It attenuates the error signal when the far-end speaker talks and the near-end speaker silent. The near-end background noise will be attenuated as well. The disappearance of the background noise during far-end single talk and re-appearance during double talk and near-end single talk can be disturbing the FE talker. Therefore, a comfort noise signal with the same level and color as the near-end background noise is generated and added to the attenuated error signal.

In an embodiment of the present invention, Adaptive Tap Detection (ATD) logic detects and tracks the active regions of the echo channel impulse response. Specifically, the ATD logic works mainly with the NLMS/Off-Line Canceller logic for estimation and tracking of dispersive regions in the echo path. The ATD logic sparsely models the echo path so the total number of filter taps is not required to be equal to the echo tail length.

Figure 2:
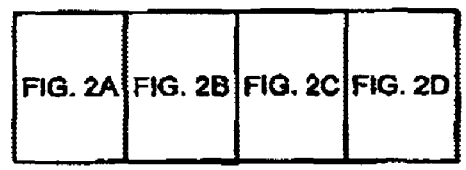
FIG. 2 is a schematic block diagram showing the relevant logic blocks of an exemplary echo canceller including active tap detection logic in accordance with an embodiment of the present invention.
Figure 2A:
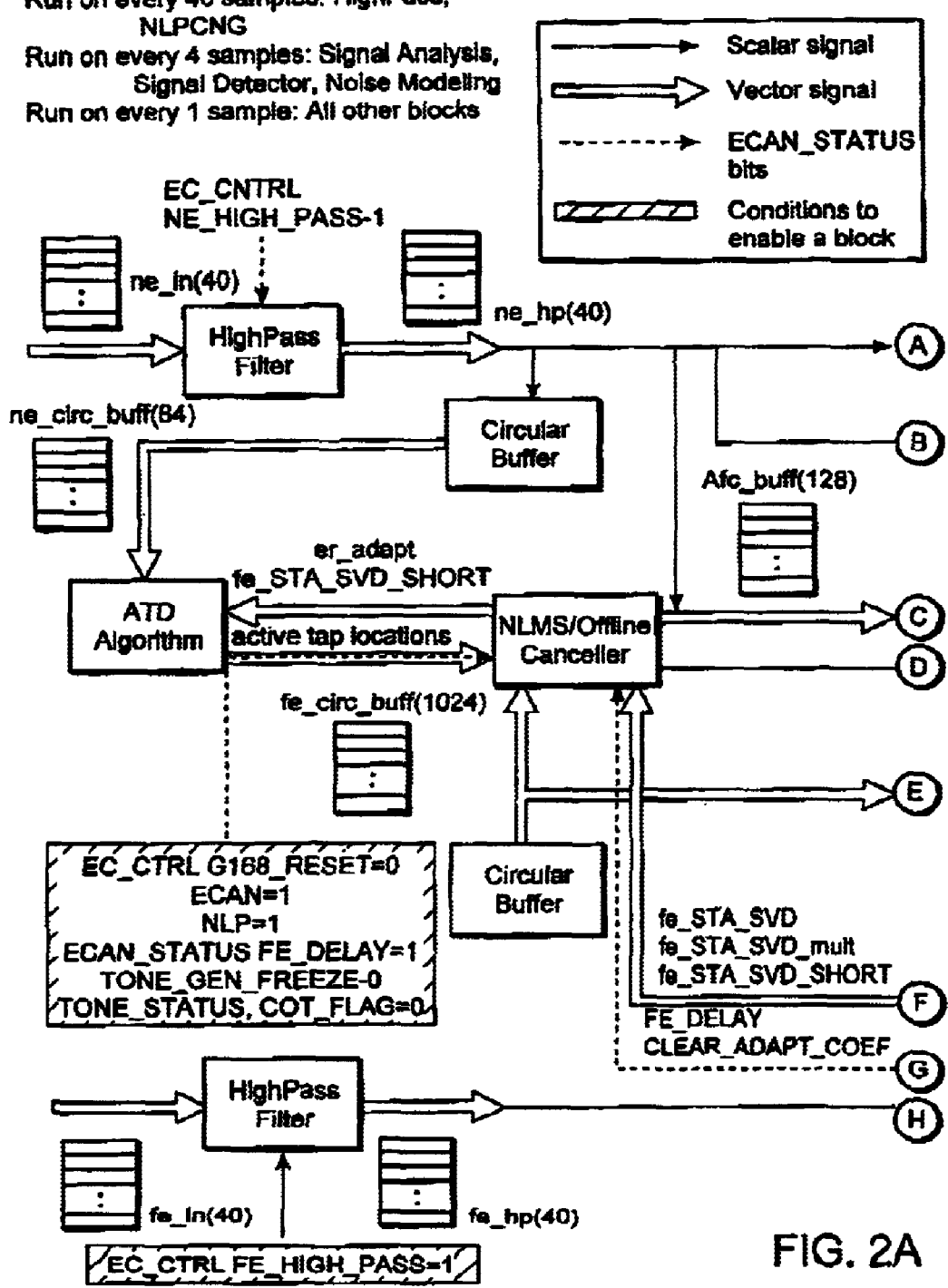
Figure 2B:
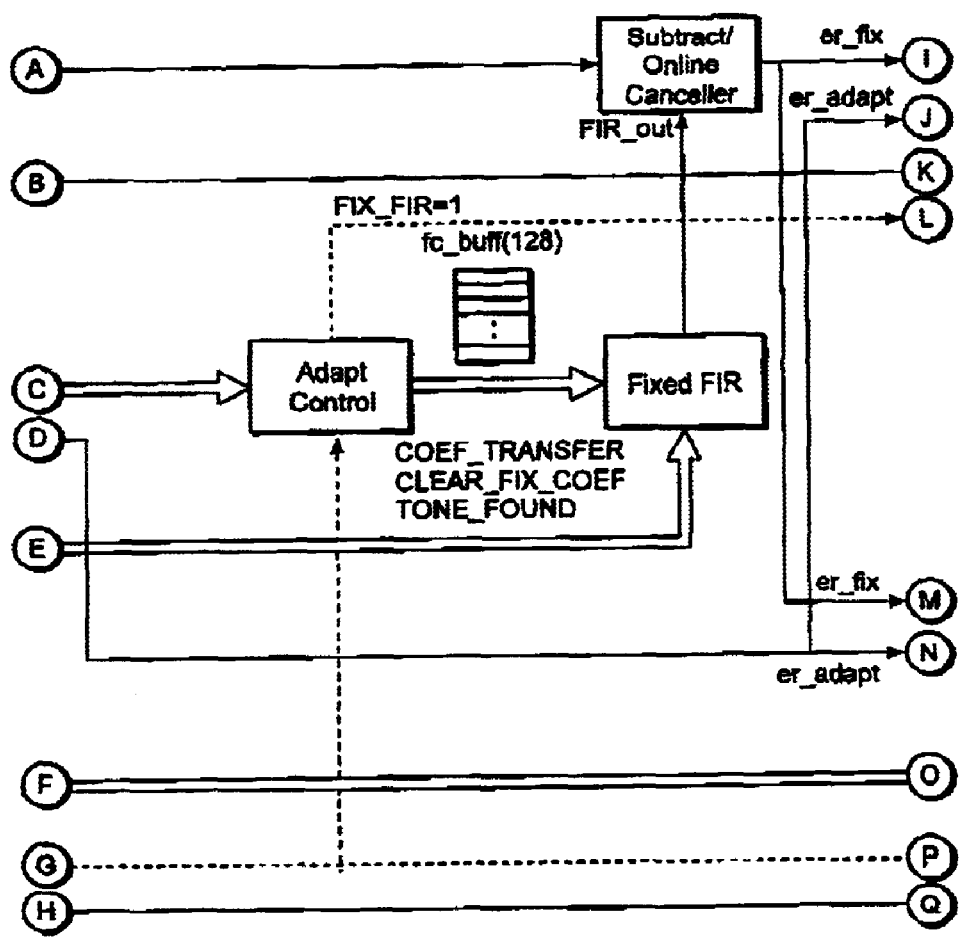
Figure 2C:
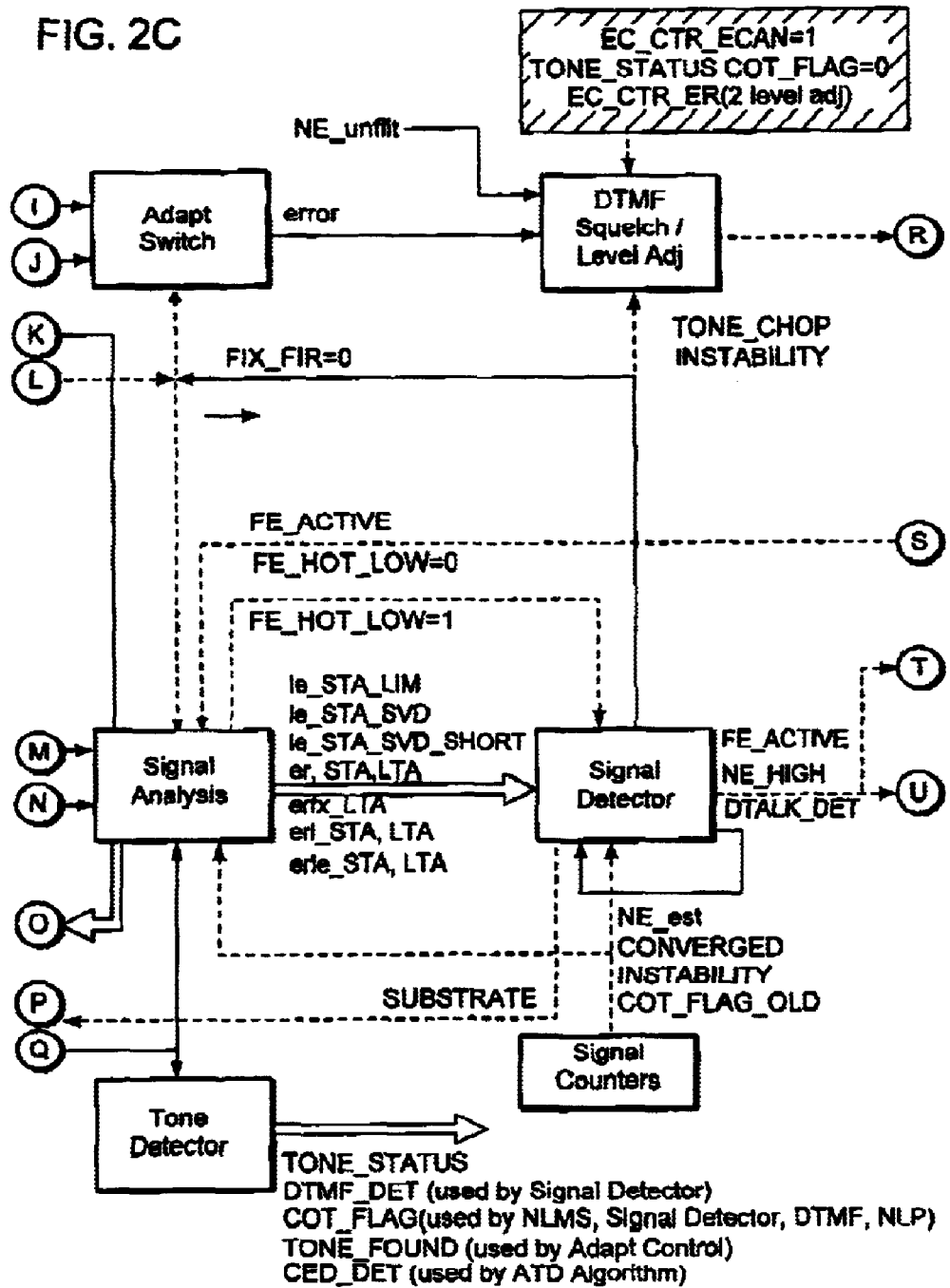
Figure 2D:
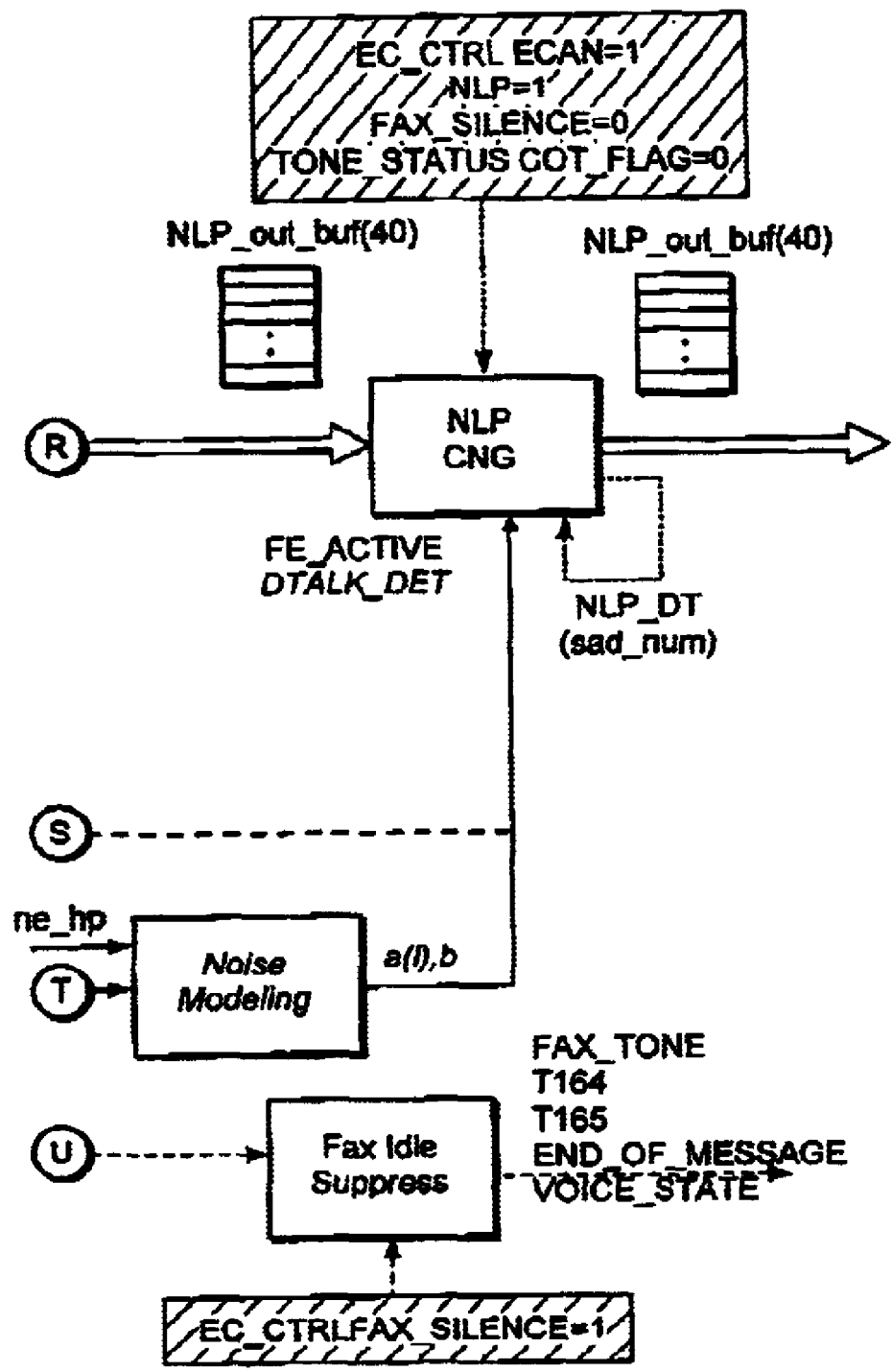

FIG. 2 is a block diagram showing the relevant logic blocks of an exemplary echo canceller 200 in accordance with an embodiment of the present invention. Among other things, the echo canceller 200 includes High-Pass Filter logic, Circular Buffer logic, Active Tap Detection (ATD) logic, NLMS/Off-Line Canceller logic, Fixed FIR logic, Adaptive Control logic, Adaptive Switch logic, Subtractor/On-Line Canceller logic, Signal Analysis logic, Signal Detection logic, DTMF Squelch logic, Noise Modeling logic, and Non-Linear Processor (NLP)/Comfort Noise Generation (CNG) logic. The High-Pass Filter logic and the NLP/CNG logic typically run every 40 samples (5 ms subrate). The Signal Analysis logic, Signal Detection logic, and Noise Modeling logic typically run every 4 samples (0.5 ms subrate). The remaining logic blocks typically run every sample (0.125 ms).

In an embodiment of the present invention, the ATD logic models the echo channel impulse response using two sets of FIR coefficients, which, for convenience, are referred to hereinafter as set A and set B. Set A has similar purpose as NLMS/Offline Canceller in FIG. 1, and is used for echo cancellation in the active regions. Set B is used to search for active regions in the echo channel impulse response that are not modeled by set A. Set B is made up of multiple short FIR filters that span the entire echo channel impulse response except for the active regions modeled by set A. Initially, no active taps are detected, so the number of filter taps used in set A is zero, and the filter taps of set B are set to span the desired impulse response tail length. A third set of filter coefficients is used by the Fixed FIR logic. Initially, the Fixed FIR filter taps are zero. Once certain criteria are satisfied, tap locations and values are transferred from the NLMS/Offline Canceller logic to the Fixed FIRlogic. After the initial transfer, tap locations and values are not updated in the Fixed FIR logic, but instead are updated in the ATD and NLMS/Offline Canceller logic and transferred to the Fixed FIR logic when some other conditions are satisfied. Tracking is done after all L reflections are found. This is performed in set A.

The following is a summary of the steps involved in detecting and tracking the active regions of the echo channel impulse response:

1. Compute the echo estimate using set A, update set A using NLMS, and subtract the echo estimate from the near-end signal.
2. If more than one reflection is present in set A, compute the echo estimate omitting the contribution from the filter taps corresponding to the least power reflection. Compare the error found by using all of the reflections with the error found by omitting the contribution from the filter taps corresponding to the least power reflection. If the error using all of the reflections is smaller than the error omitting the least power reflection, then increment an error counter; otherwise decrement the error counter.
3. Compute the echo estimate using set B, and update set B using NLMS. It should be noted that set B operates on the near-end signal minus the echo estimate computed by A. Find the first four FIRs that have the minimum averaged errors in set B, and increment a corresponding counter for each. If one of the counters exceeds a predetermined threshold, select the corresponding FIR as an active region. If it is the first active region found, select the FIR having the second highest counter as an active region as well. Transfer filter tap values from set B to set A.
4. Compare the error counter updated in step 2 with a threshold. If the error counter is less than a predetermined threshold, discard the corresponding reflection, and distribute the taps associated with the discarded reflection to the remaining reflections in A equally.
5. If all active regions are found, update active tap locations by comparing the filter tap powers of set A in each reflection. For each distinct reflection, compute the power of the filter taps corresponding to the beginning and end of a distinct reflection. If the power of the filter taps at the beginning of the reflection is greater than the power of the filter taps at the end of the reflection, then move the tap locations toward the beginning of the reflection. If the power of the filter taps at the end of the reflection is greater than the power of the filter taps as the beginning of the reflection, then move the tap locations toward the end of the reflection.

In an exemplary embodiment of the present invention, the ATD logic is logically divided into a number of functions, namely a fix_nlms function, an add_fir function, a track_taps function, and a distribute_remaining_taps function.

NLMS is used for updating both A and B. Echo estimate and updating for A and B are performed in the fix_nlms and add_fir functions, respectively. The add_fir function searches for active regions that are not modeled by A. Once active regions are found, the corresponding filter taps in B are transferred to A. The ATD logic searches for L active regions, where each region is modeled by an FIR of length N in B. Once L active regions are found, no more searching is performed. Note that this approach may limit the performance of the echo canceller, as there may be more than L active regions in the echo path. Thus, hard limiting the number of active regions to L is essentially a trade-off between performance and computational complexity. In an exemplary embodiment of the present invention, the number of reflections is typically limited to 4 (i.e., L=4). This is satisfactory for meeting the requirements of echo canceller standard G.168.

In an exemplary embodiment of the present invention, the total number of active taps used in the echo canceller is fixed and set to 128 taps. Thus, the echo canceller can cover total dispersion times of 16 ms. In the G. 168 standard, it is stated that, for the studied echo channel impulse responses, the maximum dispersion time is 12 ms and mean dispersion time is around 5–7 ms. Thus, using a fixed 16 ms of dispersion time adequately covers the impulse responses studied in G.168, and, in general, the described embodiment uses more taps than needed for G.168, which allows tracking of tail lengths beyond the one required in G.168. This slightly increases computational complexity, although the technique for tracking changes in active tap locations depends on the usage of these extra taps, so the extra overhead due to the unused taps is essentially a compromise between tracking and computational complexity.

Tracking of the active tap location changes is performed in the track_taps function by comparing the obtained tap values.

In an exemplary embodiment of the present invention, the number of taps in each short FIR is fixed at 24 (i.e., N=24). Since the ATD logic searches for a maximum of L=4 reflections, the total number of taps transferred from B to A is equal to N*L=96, which is less than the 128 total taps. The remaining 128−96=32 taps are distributed equally between the two reflections having the highest tap power (i.e., more taps are assigned to these two reflections). This distribution of taps is performed by the distribute_remaining_taps function.

The ATD logic includes logic for removing found active regions based on error. In particular, a reflection is removed if the error is greater with the reflection than without the reflection. If a reflection is removed, the corresponding number of taps in the removed reflection is distributed equally among the remaining reflections. Thus, the total number of active taps doesn't change upon removal of the reflection.

Figure 3A:
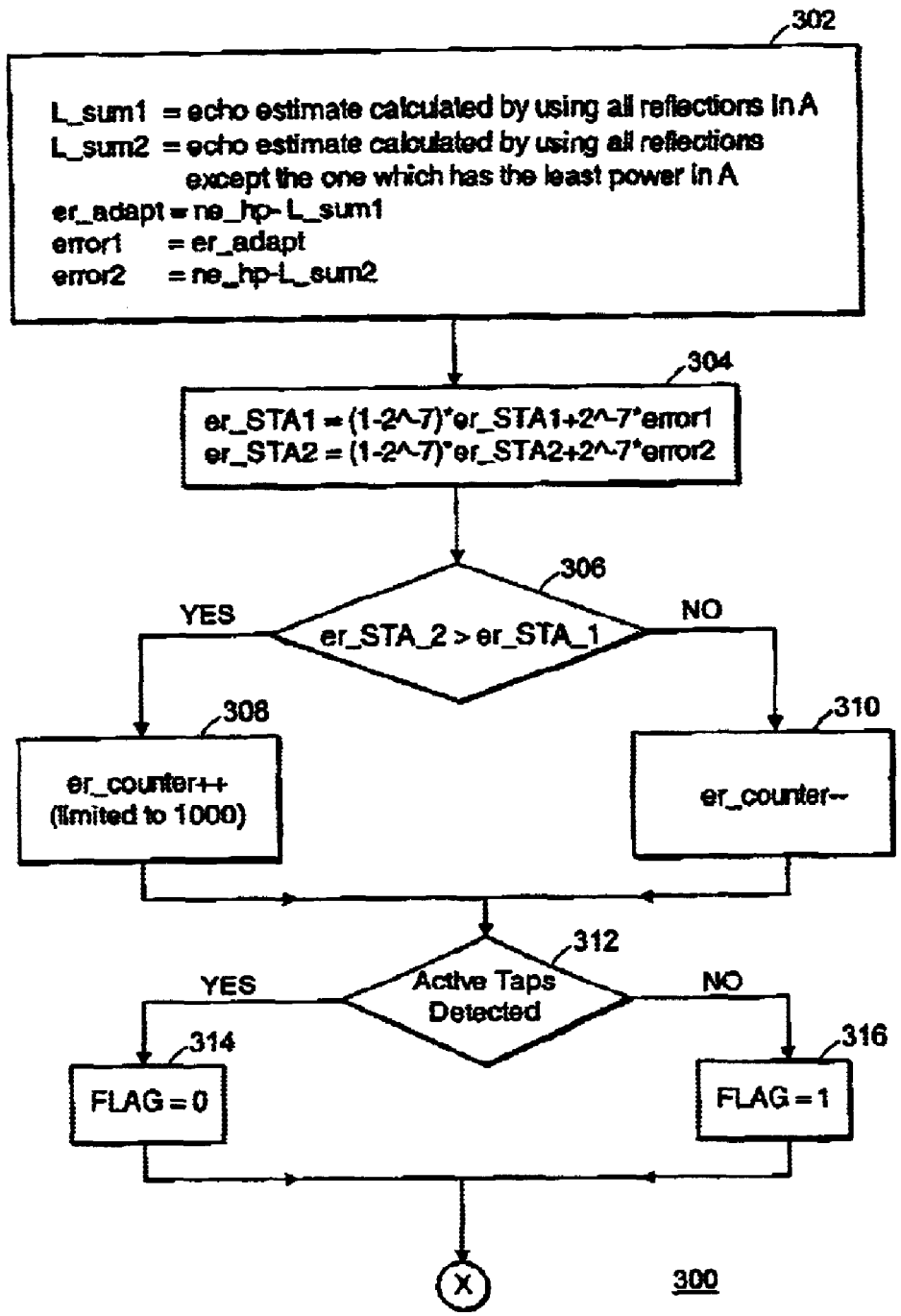
FIGS. 3A–3B are logic flow diagrams showing exemplary fix_nlms function logic in accordance with an embodiment of the present invention.
Figure 3B:
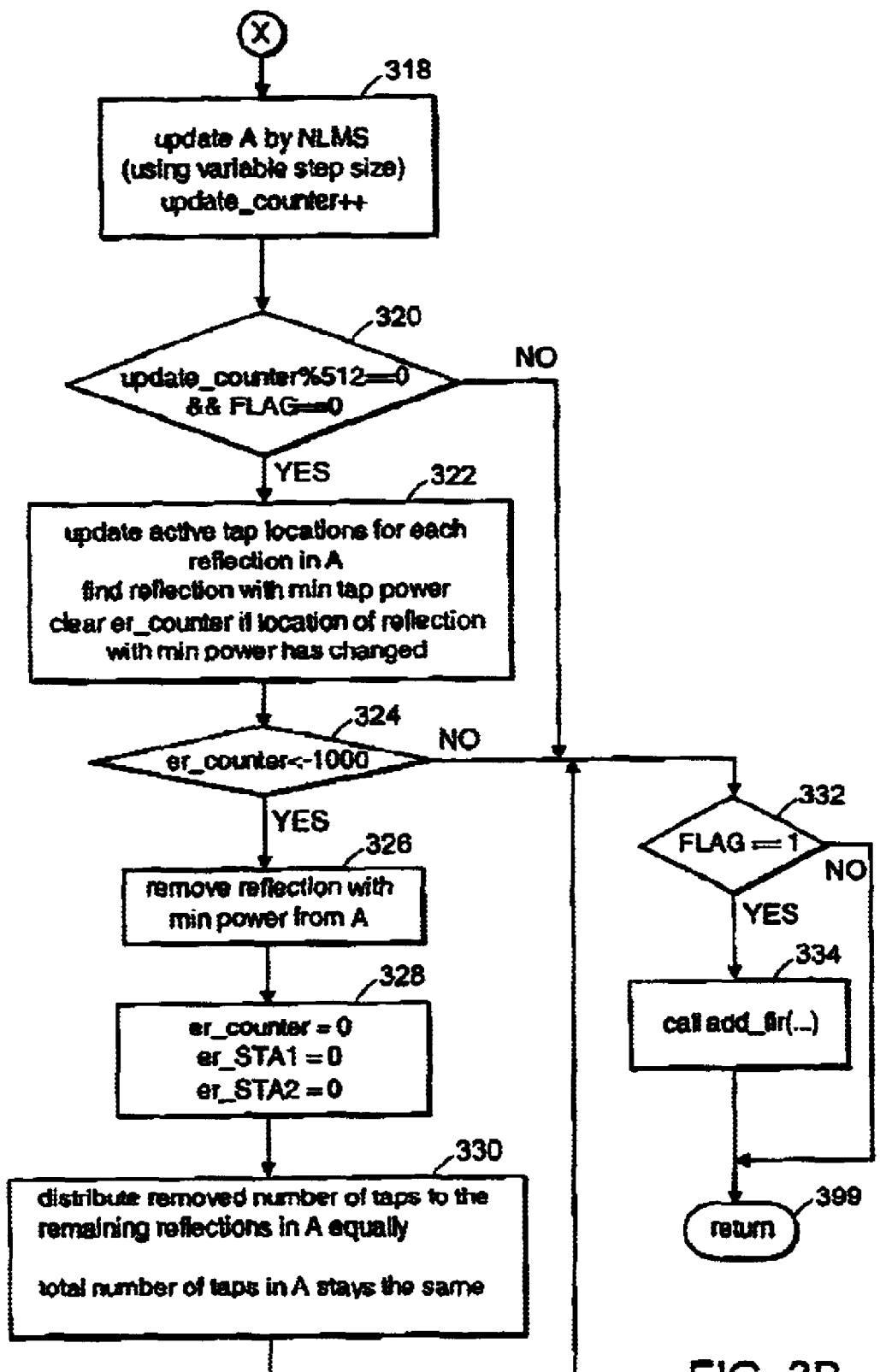

FIGS. 3A–3B are logic flow diagrams describing the fix_nlms function logic 300.

In the fix_nlms function 300, A performs echo cancellation only in the determined active regions. In block 302, the logic calculates two echo estimates, a first using all of the reflections in A (referred to hereinafter as er_adapt), and a second using all of the reflections except the one having the least tap power. In block 304, the logic averages the results of these two errors, and compares the averaged errors. If the error made by the second echo estimate is larger than the error made by the first echo estimate (YES in block 304), then the logic increments an error counter in block 308; otherwise (NO in block 304) the logic decrements the error counter in block 310. It should be noted that, when the error made by the second echo estimate is smaller than the error made by the first echo estimate, contribution of the echo estimate from the least power reflection is not useful and degrades the performance.

The logic then checks whether all L active regions in the echo path are found, in block 312. If the logic detects that all L active regions are found (YES in block 312), then the logic sets an ATD flag to zero. If the logic does not detect that all L active regions are found (NO in block 312), then the logic sets the ATD flag to one.

In block 318, the logic updates A using NLMS and increments an update counter by one.

The logic then checks whether the update counter is an integer multiple of 512 and the ATD flag is set to zero, in block 320. If the update counter is not an integer multiple of 512 or the ATD flag is set to one (NO in block 320), then the logic proceeds to block 332. If the update counter is an integer multiple of 512 and the A/D flag is set to zero (YES in block 320), then the logic updates the active tap locations for each reflection in A using the track_taps function, finds the reflection with the minimum tap power, and clears the error counter if the location of the reflection with the minimum power is changed, in block 322. Then, if the error counter is less than a predetermined threshold (preferably minus 1000) (YES in block 324), the logic removes the reflection having the least power from A, in block 326, and clears the error counter and the error estimates, in block 328. The logic then distributes the number of taps removed from the least power reflection among the other reflections equally, in block 330. Thus, the total number of taps used in A stays the same. It should be noted that the number of taps assigned for each reflection does not change unless a reflection is removed.

In any case, the logic checks the ATD flag in block 332. If the ATD flag is equal to one (YES in block 332), then the logic calls the add_fir function, in block 334. The logic 300 terminates in block 399.

Filter set B is made up of multiple short FIRs, which span the whole tail length. Each FIR has length N. In this embodiment of the present invention, N is equal to 24. Since the total tail length in this embodiment is 128 ms, there are $128*8/24=43$ short FIRs. Each FIR has its own counter, which is initially set to zero. Each FIR is preferably located in a non-overlapping way to cover the entire tail length. Specifically, the first FIR covers taps from 1 to 24, the second FIR covers taps from 25 to 48, and so on, such that the $j^{th}$ FIR covers taps from $(j-1)*24+1$ to $j*24$. Each short FIR uses er_adapt as the near-end signal (i.e. the error remaining after A).

Figure 4A:
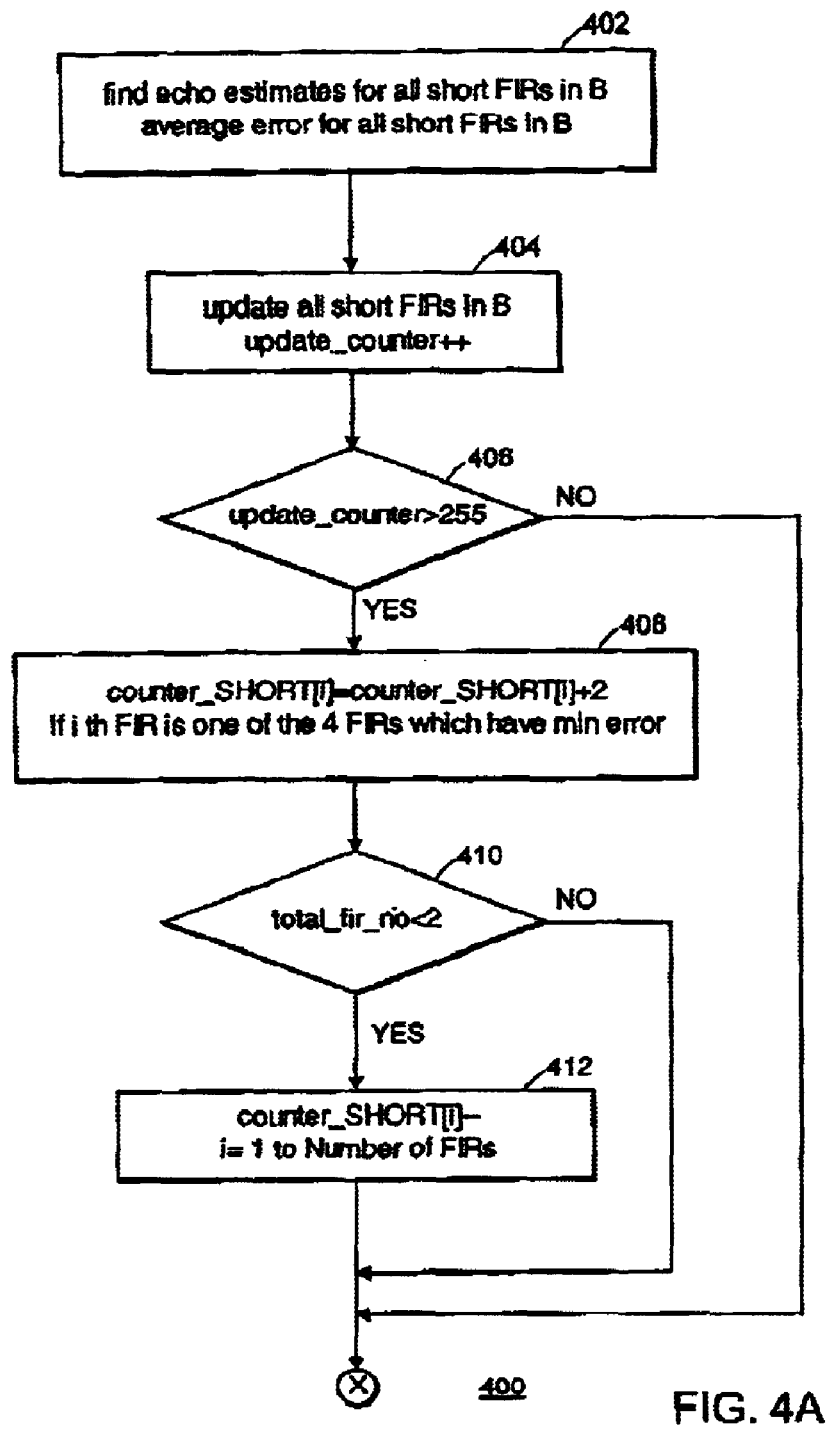
FIGS. 4A–4C are logic flow diagrams showing exemplary add_fir function logic in accordance with an embodiment of the present invention.
Figure 4B:
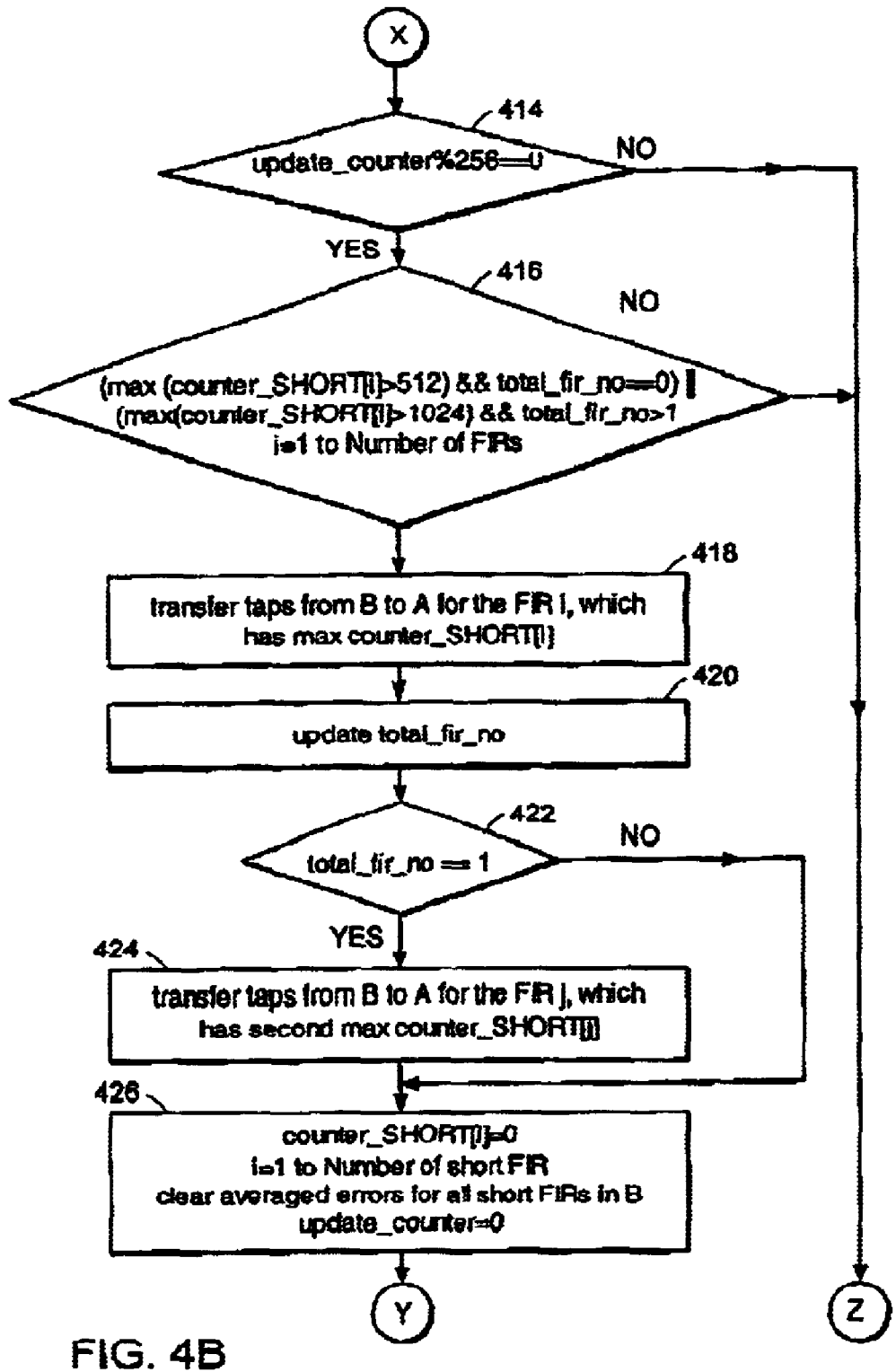
Figure 4C:
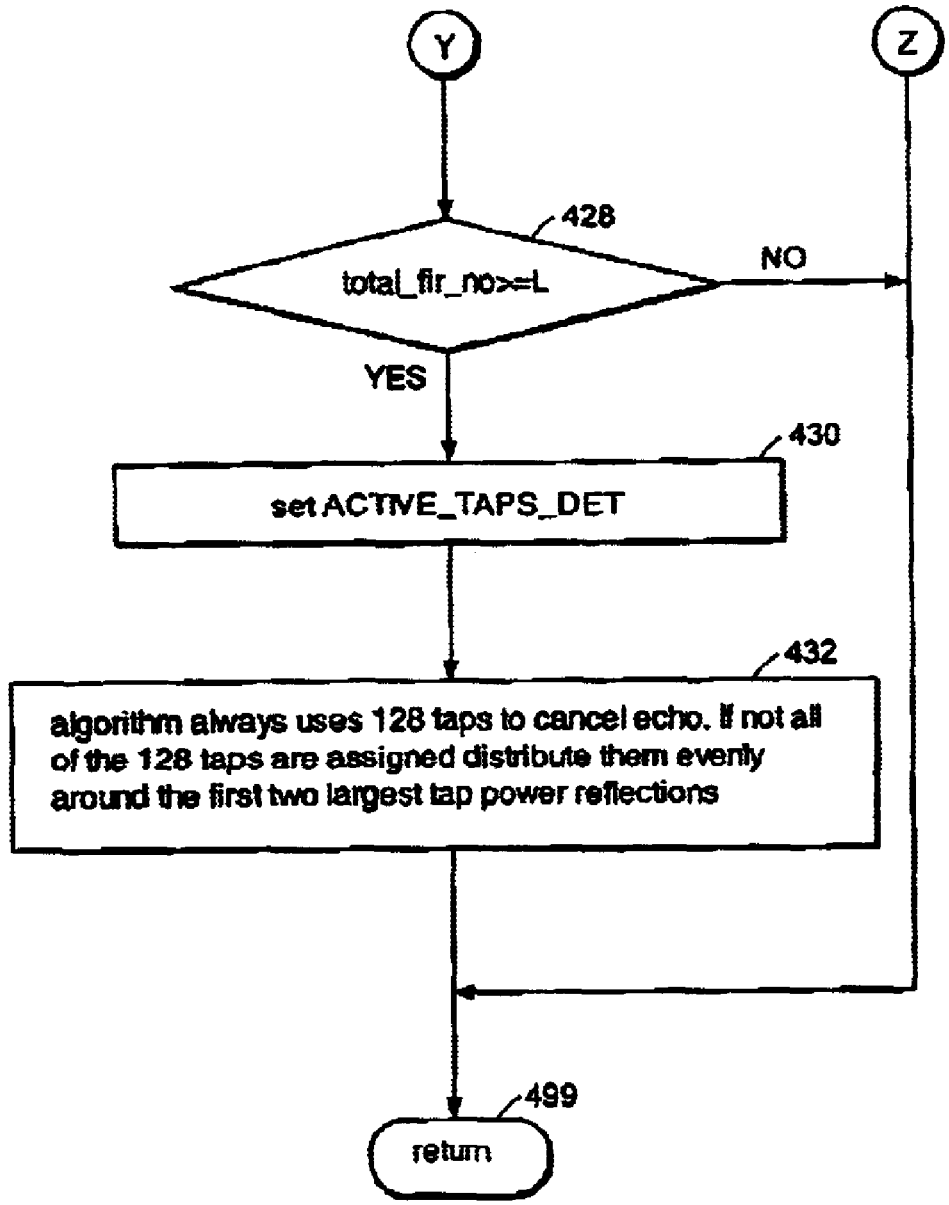

FIGS. 4A–4C are logic flow diagrams describing the add_fir function logic 400.

In block 402, the logic finds echo estimates for all short FIRs in B, and averages the error for all short FIRs in B. It should be noted that each short FIR works independently from one another. The logic then updates all short FIRs in B using NLMS and increments the update counter by one, in block 404.

If the update counter is greater than 255 (YES in block 406), then the logic finds the first four FIRs having the minimum averaged error and increments the corresponding counters by two, in block 408. If the total number of active FIRs (total_fir_no) is less than two (YES in block 410), then all FIR counters are decremented by one, in block 412. It should be noted that the variable total_fir_no takes values between 0 and L, where L is the maximum number of reflections possible.

In any case, the logic then checks whether the update counter is an integer multiple of 256 and the condition for active tap selection is satisfied, in blocks 414 and 416. If the update counter is an integer multiple of 256 and the condition for active tap selection is satisfied (YES in blocks 414 and 416), then the logic transfers the taps from B to A for the $i^{th}$ FIR having the maximum counter value, in block 418. The logic then updates the total_fir_no, in block 420. Then, if the total_fir_no is equal to one (YES in block 422), then the logic transfers the taps from B to A for the $j^{th}$ FIR having the second maximum counter value, in block 424. Whether or not the total_fir_no was equal to one in block 422, the logic clears all FIR counters, the averaged errors for all short FIRs in B, and update counter, in block 426, and checks whether total_fir no is greater than or equal to L, in block 428. If total_fir_no is greater than or equal to L (YES in block 428), then the logic sets the ATD flag to one, in block 430, and distributes the remaining 32 taps equally between the two reflections having the highest tap power, in block 432. The logic 400 terminates in block 499.

Figure 5:
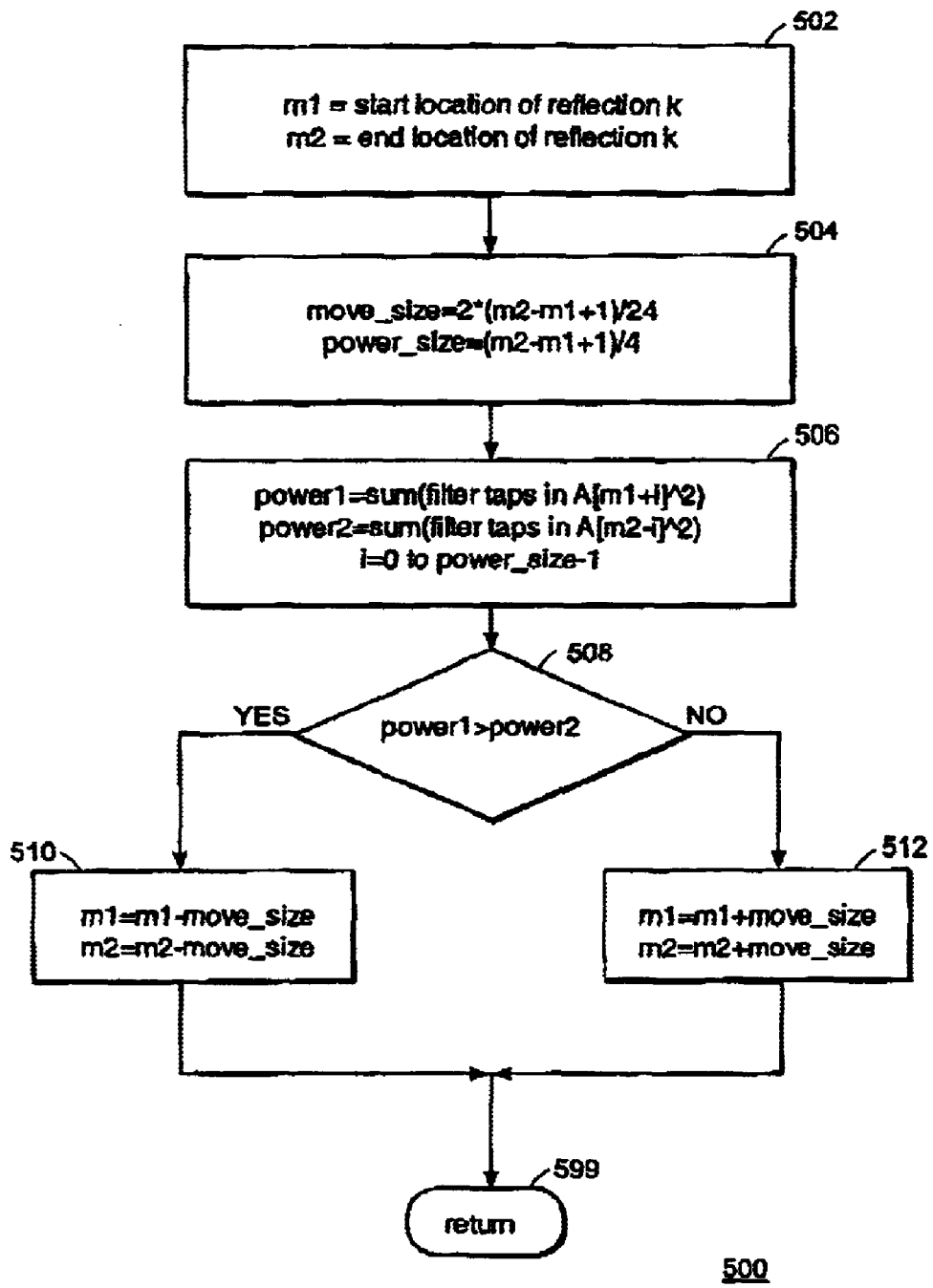
FIG. 5 is a logic flow diagram showing exemplary track_taps function logic in accordance with an embodiment of the present invention.

FIG. 5 is a logic flow diagram describing the track_taps function logic 500 for tracking the possible active tap location changes in the echo path. Tracking is performed on set A after all L active regions in the echo path are found and conditions in block 320 are satisfied.

In block 502, the logic sets a variable m1 equal to the starting tap location of reflection k and sets a variable m2 equal to the ending tap location of reflection k. In block 504, the logic sets a variable move_size equal to 2*(m2−m1+1)/24 and sets a variable power_size equal to (m2−m1+1)/4. In block 506, the logic sets a variable power1 equal to the sum of all filter tap values squared in set A between tap locations m1 and m1+power_size−1, and sets a variable power2 equal to the sum of all filter tap values squared in set A between tap locations m2−power_size+1 and m2. If power1 is greater than power2 (YES in block 508), then the logic moves the start of reflection k from m1 to m1−move_size and moves the end of reflection k from m2 to m2−move_size, in block 510. Otherwise (NO in block 508), the logic moves the start of reflection k from m1 to m1+move_size and moves the end of reflection k from m2 to m2+move_size, in block 512. The logic 500 terminates in block 599. It should be noted that the track_taps function is executed for all reflections (reflection 1 to L).

Figure 6:
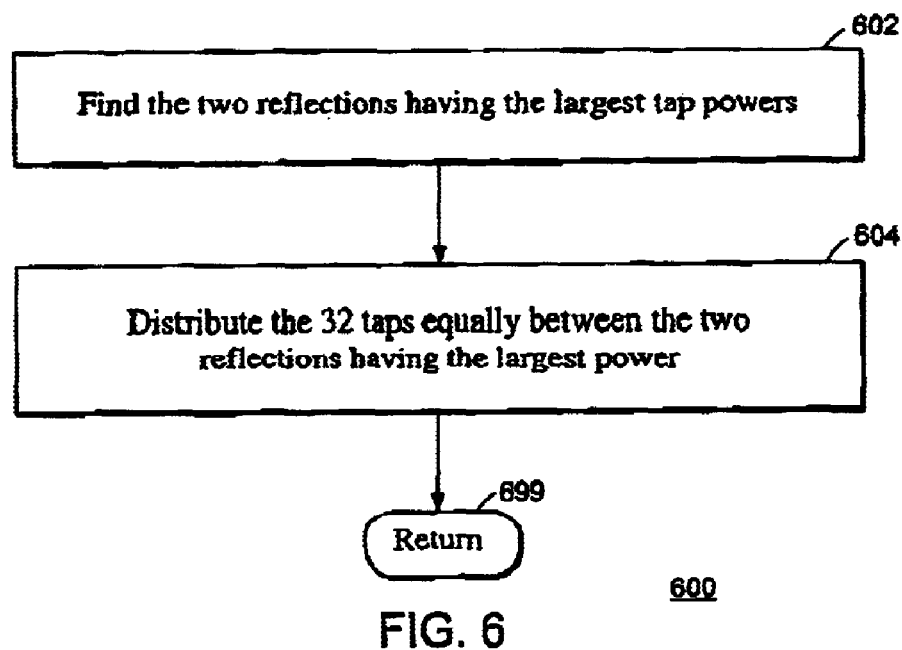
FIG. 6 is a logic flow diagram showing exemplary distribute_remaining_taps function logic in accordance with an embodiment of the present invention.

FIG. 6 is a logic flow diagram describing the distribute_remaining_taps function logic 600. In block 602, the logic finds the two reflections having the largest tap powers. In block 604, the logic distributes the 32 taps equally between the two reflects having the largest tap powers. The logic 600 terminates in block 699.

The ATD logic described heretofore does not work well for certain periodic far-end signals, such as various facsimile signals in accordance with Test 10 of the G.168 standard. In Test 10 of the G.168 standard, a Called Station Identification (CED) signal is periodic with 2100±15 Hz, and test sequence 2 in Test 10B is periodic with a period of 213.33 samples. In such periodic signals, it is virtually impossible for the short FIRs to distinguish a reflection that starts at a time $t_d$ from a reflection that starts at a time $t_d+t_p$, where $t_p$ is the period of far-end signal. Therefore, when the universal tone detector detects a tone of 2100 Hz (CED) or a periodic signal with a period of 213.33*3=640 samples (test sequence 2, Test 10B), the ATD logic is disabled.

The present invention may be embodied in other specific forms without departing from the true scope of the invention. The described embodiments are to be considered in all respects only as illustrative and not restrictive.

What is claimed is:

1. A method for canceling an echo component of a received signal, the method comprising:

detecting active regions of an echo channel impulse response by:

computing an estimate of the echo channel impulse response using a number of short finite impulse response filters represented by a second set of filter coefficients;

computing an average error for each short finite impulse response filter; and identifying up to L short finite impulse response filters having a lowest average errors, where L is a predetermined maximum number of reflections tracked by the echo canceller; and detecting active regions of an echo channel impulse response; and filtering only portions of the received signal corresponding to the active regions of the echo channel impulse response using a first set of filter coefficients to cancel the echo component of the received signal.

2. The method of claim 1, wherein filtering the signal corresponding to the active regions of the echo channel impulse response:

transferring to the first set of filter coefficients those filter taps from the second set of filter coefficients corresponding to at least one short finite impulse response filter having the lowest average error.

3. The method of claim 2, wherein transferring to the first set of filter coefficients those filter taps from the second set of filter coefficients corresponding to at least one short finite impulse response filter having the lowest average error comprises:

initially transferring two short finite impulse response filters having the lowest average errors from the second set of filter coefficients to the first set of filter coefficients; and subsequently transferring short finite impulse response filters having the lowest average errors one at a time from the second set of filter coefficients to the first set of filter coefficients.

4. The method of claim 2, further comprising:

distributing a number of additional filter taps equally among the two reflections having the highest tap powers modeled by the first set of filter coefficients.

5. A method for canceling an echo component of a received signal the method comprising:

detecting active regions of an echo channel impulse response; and filtering only portions of the received signal corresponding to the active regions of the echo channel impulse response using a first set of filter coefficients to cancel the echo component of the received signal;

computing a first average error using all reflections modeled by the first set of filter coefficients;

computing a second average error using all reflections modeled by the first set of filter coefficients except the lowest power reflection; and removing the lowest power reflection from the first set of filter coefficient if the second average error is smaller than the first average error.

6. The method of claim 5, further comprising:

distributing the filter taps associated with the removed lowest power reflection among the remaining reflections modeled by the first set of filter coefficients.

7. A method for canceling an echo component of a received signal, the method comprising;

detecting active regions of an echo channel impulse response; and filtering only portions of the received signal corresponding to the active regions of the echo channel impulse response using a first set of filter coefficients to cancel the echo component of the received signal;

tracking reflections in the filtered echo channel impulse response using the first set of filter coefficients; and revising the first set of filter coefficients based upon the filter tap powers of the corresponding reflection.

8. An echo canceller for canceling an echo component of a received signal comprising active tap detection logic operably coupled to filter only a portion of the received signal corresponding to the active regions of an echo channel impulse response using a first set of filter coefficients to cancel the echo component of the received signal, track the change in the location of each reflection of the received signal using the first set of filter coefficients, and detect active regions of the echo channel impulse response using a second set of filter coefficients;

wherein the active tap detection logic is operably coupled to compute an estimate of the echo channel impulse response using a number of short finite impulse response filters represented by a second set of filter coefficients, compute an average error for each short finite impulse response filter, and identify up to L short finite impulse response filters having a lowest average errors, where L is a predetermined maximum number of reflections tracked by the echo canceller.

9. The echo canceller of claim 8, wherein the active tap detection logic is operably coupled to transfer to the first set of filter coefficients those filter taps from the second set of filter coefficients corresponding to the L short finite impulse response filters having the lowest average errors.

10. The echo canceller of claim 9, wherein transferring of filter coefficients is performed by initially transferring 2 short finite impulse response filters having the lowest average errors and then transferring short finite impulse responses having the lowest average error one at a time, up to L short finite impulse response.

11. The echo canceller of claim 10, wherein the active tap detection logic is operably coupled to distribute a number of additional filter taps equally among the two reflections having the highest tap powers modeled by the first set of filter coefficients.

12. The echo canceller of claim 8, wherein the active tap detection logic is operably coupled to track reflections in the filtered echo channel impulse response using the first set of filter coefficients by comparing filter tap powers in each reflection.

13. An echo canceller for canceling an echo component of a received signal comprising active tap detection logic operably coupled to filter only a portion of the received signal corresponding to the active regions of an echo channel impulse response using a first set of filter coefficients to cancel the echo component of the received signal, track the change in the location of each reflection of the received signal using the first set of filter coefficients, and detect active regions of the echo channel impulse response using a second set of filter coefficients;

wherein the active tap detection logic is operably coupled to compute a first average error using all reflections modeled by the first set of filter coefficients, compute a second average error using all reflections modeled by the first set of filter coefficients except the lowest power reflection, and remove the lowest power reflection from the first set of filter coefficients if the second average error is smaller am the first average error.

14. The echo canceller of claim 13, wherein the active tap detection logic is operably coupled to distribute the filter taps associated with the removed lowest power reflection among the remaining reflections modeled by the first set of filter coefficients.

15. A method for canceling an echo component of a received signal, the method comprising:

detecting active regions of an echo channel impulse response; and filtering the signal corresponding to the active regions of the echo channel impulse response using a first set of filter coefficients;

computing an estimate of the echo channel impulse response using a number of short finite impulse response filters represented by a second set of filter coefficients;

computing an average error for each short finite impulse response filter, and identifying up to L short finite impulse response filters having a lowest average errors, where L is a predetermined maximum number of reflections tracked by the echo canceller.

16. The method of claim 15, wherein filtering the signal corresponding to the active regions of the echo channel impulse response:

transferring to the first set of filter coefficients those filter taps from the second set of filter coefficients corresponding to at least one short finite impulse response filter having the lowest average error.

17. The method of claim 16, wherein transferring to the first set of filter coefficients those filter taps from the second set of filter coefficients corresponding to at least one short finite impulse response filter having the lowest average error comprises:

initially transferring two short finite impulse response filters having the lowest average from the second set of filter coefficients to the first set of filter coefficients; and subsequently transferring short finite impulse response filters having the lowest average errors one at a time from the second set of filter coefficients to the first set of filter coefficients.

18. The method of claim 16, further comprising:

distributing a number of additional filter taps equally among the two reflections having the highest tap power modeled by the first set of filter coefficients.

19. A method for canceling an echo component of a received signal, the method comprising:

detecting active regions of an echo channel impulse response; and filtering the signal corresponding to the active regions of the echo channel impulse response using a first set of filter coefficients;

computing a first average error using all reflections modeled by the first set of filter coefficients;

computing a second average error using all reflections modeled by the first set of filter coefficients except the lowest power reflection; and removing the lowest power reflection from the first set of filter coefficients if the second average error is smaller than the first average error.

20. The method of claim 19, further comprising:

distributing the filter taps associated with the removed lowest power reflection among the remaining reflections modeled by the first set of filter coefficients.

21. The method of claim 19, further comprising:

tracking reflections in the filtered echo channel impulse response using the first set of filter coefficients; and revising the first set of filter coefficients based upon the filter tap powers of the corresponding reflection.

22. An echo canceller comprising active tap detection logic operably coupled to filter the signal corresponding to the active regions of an echo channel impulse response using a first set of filter coefficients, track the change in the location of each reflection using a first set of filter coefficients, and detect active regions of the echo channel impulse response using a second set of filter coefficients, wherein the active tap detection logic is operably coupled to compute an estimate of the echo channel impulse response using a number of short finite impulse response filters represented by a second set of filter coefficients, compute an average error for each short finite impulse response filter, and identify up to L short finite impulse response filters having a lowest average errors, where L is a predetermined maximum number of reflections tracked by the echo canceller.

23. The echo canceller of claim 22, wherein the active tap detection logic is operably coupled to transfer to the first set of filter coefficients those filter taps from the second set of filter coefficients corresponding to the L short finite impulse response filters having the lowest average errors.

24. The echo canceller of claim 23, wherein transferring of filter coefficients is performed by initially transferring 2 short finite impulse response filters having the lowest average errors and then transferring short finite impulse responses having the lowest average error one at a time, up to L short finite impulse response.

25. The echo canceller of claim 24, wherein the active tap detection logic is operably coupled to distribute a number of additional filter taps equally among the two reflections having the highest tap powers modeled by the first set of filter coefficients.

26. An echo canceller comprising active tap detection logic operably coupled to filter the signal corresponding to the active regions of an echo channel impulse response using a first set of filter coefficients, track the change in the location of each reflection using a first set of filter coefficients, and detect active regions of the echo channel impulse response using a second set of filter coefficients, wherein the active tap detection logic is operably coupled to compute a first average error using all reflections modeled by the first set of filter coefficients, compute a second avenge error using all reflections modeled by the first set of filter coefficients except the lowest power reflection, and remove the lowest power reflection from the first set of filter coefficients if the second average error is smaller than the first average error.

27. The echo canceller of claim 26, wherein the active tap detection logic is operably coupled to distribute the filter taps associated with the removed lowest power reflection among the remaining reflections modeled by the first set of filter coefficients.

28. The echo canceller of claim 26, wherein the active tap detection logic is operably coupled to track reflections in the filtered echo channel impulse response using the first set of filter coefficients by comparing filter tap powers in each reflection.

* * * * *

UNITED STATES PATENT AND TRADEMARK OFFICE
CERTIFICATE OF CORRECTION

| | |
|---|---|
| PATENT NO. | : 6,980,646 B1 |
| APPLICATION NO. | : 09/977005 |
| DATED | : December 27, 2005 |
| INVENTOR(S) | : Demirekler et al. |

It is certified that error appears in the above-identified patent and that said Letters Patent is hereby corrected as shown below:

At column 10, line 61, received signal, the method comprising:

At column 11, line 7, filter coefficients if the second average

At column 11, line 14, received signal, the method comprising[;] :

At column 12, line 15, error is smaller [am] than the first average error

At column 12, line 32, response filter[,] : and identifying

At column 12, line 50, filters having the lowest average errors from

At column 12, line 58, among the two reflections having the highest tap powers

At column 14, line 20, by the first set of filter coefficients, compute a second [avenge] average Signed and Sealed this Twenty-second Day of August, 2006

JON W. DUDAS
*Director of the United States Patent and Trademark Office*